(12) United States Patent
Kang et al.

(10) Patent No.: US 9,141,238 B2
(45) Date of Patent: Sep. 22, 2015

(54) FLEXIBLE TOUCH SCREEN PANEL HAVING A FLEXIBLE POLARIZING FILM INCLUDING A POLARIZER, A PHASE DIFFERENCE COMPENSATING LAYER, AND A TRANSPARENT ADHESIVE, AND FLEXIBLE DISPLAY DEVICE INCLUDING THE SAME

(75) Inventors: Sung-Ku Kang, Yongin (KR); Tae-Hyeog Jung, Yongin (KR); Hak-Sun Kim, Yongin (KR); Akira Hirai, Yongin (KR); Choon-Hyop Lee, Yongin (KR)

(73) Assignee: SAMSUNG DISPLAY CO., LTD., Yongin, Gyunggi-Do (KR)

( * ) Notice: Subject to any disclaimer, the term of this patent is extended or adjusted under 35 U.S.C. 154(b) by 27 days.

(21) Appl. No.: 13/591,424

(22) Filed: Aug. 22, 2012

(65) Prior Publication Data
US 2013/0285938 A1 Oct. 31, 2013

(30) Foreign Application Priority Data
Apr. 26, 2012 (KR) .................. 10-2012-0043833

(51) Int. Cl.
*G06F 3/041* (2006.01)
*G06F 3/044* (2006.01)
*G02F 1/1335* (2006.01)
*G02F 1/13363* (2006.01)

(52) U.S. Cl.
CPC ............... *G06F 3/044* (2013.01); *G06F 3/041* (2013.01); *G02F 1/13363* (2013.01); *G02F 1/133528* (2013.01); *G06F 2203/04103* (2013.01); *G06F 2203/04113* (2013.01)

(58) Field of Classification Search
CPC ..................................................... G06F 3/041
See application file for complete search history.

(56) References Cited

U.S. PATENT DOCUMENTS

| 5,737,044 A * | 4/1998 | Van Haaren et al. ........... 349/61 |
| 2006/0012737 A1* | 1/2006 | Hirai et al. .................... 349/114 |
| 2011/0012845 A1* | 1/2011 | Rothkopf et al. ............. 345/173 |
| 2011/0037713 A1* | 2/2011 | Chen et al. .................... 345/173 |
| 2011/0102346 A1* | 5/2011 | Orsley et al. .................. 345/173 |
| 2011/0305493 A1* | 12/2011 | Wu et al. ....................... 400/472 |

FOREIGN PATENT DOCUMENTS

| KR | 10-2008-0044319 A | 5/2008 |
| KR | 10-2008-0075779 A | 8/2008 |
| KR | 10-2011-0039088 A | 4/2011 |
| KR | 10-2011-0039182 A | 4/2011 |
| KR | 10-2012-0076026 A | 7/2012 |
| WO | WO 2010/102491 A1 | 9/2010 |

* cited by examiner

*Primary Examiner* — Joseph Feild
*Assistant Examiner* — Karin Kiyabu
(74) *Attorney, Agent, or Firm* — Lee & Morse, P.C.

(57) ABSTRACT

A flexible touch screen panel includes a polarizing film having an active region and a non-active region, the non-active region being along an outline of the active region, and the polarizing film having a polarizer, a phase difference compensating layer defining a first surface of the polarizing film, and a transparent adhesive between the phase difference compensating layer and the polarizer, the transparent adhesive being configured to support the polarizer, sensing patterns on the first surface of the polarizing film, the sensing patterns being in the active region, and sensing lines on the first surface of the polarizing film, the sensing lines being in the non active region and being coupled to the sensing patterns.

17 Claims, 3 Drawing Sheets

FLEXIBLE TOUCH SCREEN PANEL HAVING A FLEXIBLE POLARIZING FILM INCLUDING A POLARIZER, A PHASE DIFFERENCE COMPENSATING LAYER, AND A TRANSPARENT ADHESIVE, AND FLEXIBLE DISPLAY DEVICE INCLUDING THE SAME

CROSS-REFERENCE TO RELATED APPLICATION

This application claims priority to and the benefit of Korean Patent Application No. 10-2012-0043833, filed on Apr. 26, 2012, in the Korean Intellectual Property Office, the entire content of which is incorporated herein by reference.

BACKGROUND

1. Field

Example embodiments relate to a touch screen panel, and more particularly, to a flexible touch screen panel and a flexible display device including the same.

2. Description of the Related Arts

A touch screen panel is an input device capable of inputting a command of a user by allowing the user to touch a screen with his/her hand or with an object to select or indicate content displayed on the screen. For example, the touch screen panel may be provided on a large surface of an image display device and may convert a contact position of the human hand or object on the screen into an electrical signal. As such, the content corresponding to the contact position is received as an input signal. Since the touch screen panel may eliminate use of an additional input device coupled to the image display device, e.g., a keyboard or a mouse, the use of the touch screen panel is gradually increasing.

Methods of realizing a touch screen panel may include, e.g., a resistance layer method, a photo-sensing method, and an electrostatic capacity method. For example, a touch screen panel realized by the electrostatic capacitive method senses a change in capacity of a conductive sense pattern together with another peripheral sense pattern or a ground electrode when the human hand or object contacts the touch screen panel to convert the contact position into an electric signal.

The touch screen panel may be attached to an external surface of the image display device, e.g., to a liquid crystal display (LCD) or an organic light emitting diode display. Therefore, the touch screen panel requires high transmittance and small thickness. Further, if the touch screen panel is attached to a flexible image display device, the touch screen panel may require flexibility. Also, the touch screen panel may include a polarizer and a pattern, thereby requiring high thermal and chemical resistance

SUMMARY

Example embodiments provide a flexible touch screen panel with sensing patterns on a flexible polarizing film, thereby securing flexibility, reducing thickness, and improving display of an image.

Example embodiments also provide a flexible display device including a flexible touch screen panel with one or more of the above features.

Example embodiments are directed toward a flexible touch screen panel that includes a polarizing film on an active region and on a non-active region, the non-active region being along an outline of the active region, and the polarizing film having a polarizer, a phase difference compensating layer defining a first surface of the polarizing film, and a transparent adhesive between the phase difference compensating layer and the polarizer, the transparent adhesive being configured to support the polarizer, sensing patterns on the first surface of the polarizing film, the sensing patterns being in the active region, and sensing lines on the first surface of the polarizing film, the sensing lines being in the non active region and being coupled to the sensing patterns.

The transparent adhesive may be a pressure sensitive adhesive (PSA).

The flexible touch screen panel may further include a window substrate on a second surface of the polarizing film, the polarizer being between the window substrate and the transparent adhesive.

The window substrate may include at least one of polymethyl methacrylate (PMMA), acryl, and polyester.

The polarizer may include a drawn polymer film and has an absorption axis in the drawing direction.

The absorption axis of the polarizer may be at an angle of about 45 degrees to about 90 degrees with respect to a bending axis of the flexible touch screen panel.

The drawn polymer film may include polyvinyl alcohol based resin.

The sensing patterns may include first sensing cells coupled to each other in a first direction, first coupling lines coupling adjacent first sensing cells, second sensing cells coupled to each other in a second direction, and second coupling lines coupling adjacent second sensing cells.

The flexible touch screen panel may further include an insulating layer at intersections of the first coupling lines and the second coupling lines.

The flexible touch screen panel may further include a black matrix in the non active region of the first surface of the polarizing film.

The polarizing film the phase difference compensating layer, the transparent adhesive, and the polarizer may be directly stacked on the sensing pattern.

The transparent adhesive may be directly between the phase difference compensating layer and the polarizer.

The polarizing film may consist essentially of the phase difference compensating layer, the transparent adhesive, and the polarizer.

Example embodiments are also directed toward a flexible display device with a flexible touch screen panel, the flexible display device including a polarizing film on an active region and on a non-active region, the non-active region being along an outline of the active region, and the polarizing film having a polarizer, a phase difference compensating layer defining a first surface of the polarizing film, and a transparent adhesive between the phase difference compensating layer and the polarizer, the transparent adhesive being configured to support the polarizer, sensing patterns on the first surface of the polarizing film, the sensing patterns being in the active region, sensing lines on the first surface of the polarizing film, the sensing lines being in the non active region and being coupled to the sensing patterns, and a flexible display device attached in the direction of the first surface of the polarizing film to face the sensing patterns and the sensing lines.

The flexible display device may be an organic light emitting display.

The flexible display device may further include a window substrate on a second surface of the polarizing film.

The window substrate may include at least one of polymethyl methacrylate (PMMA), acryl, and polyester.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
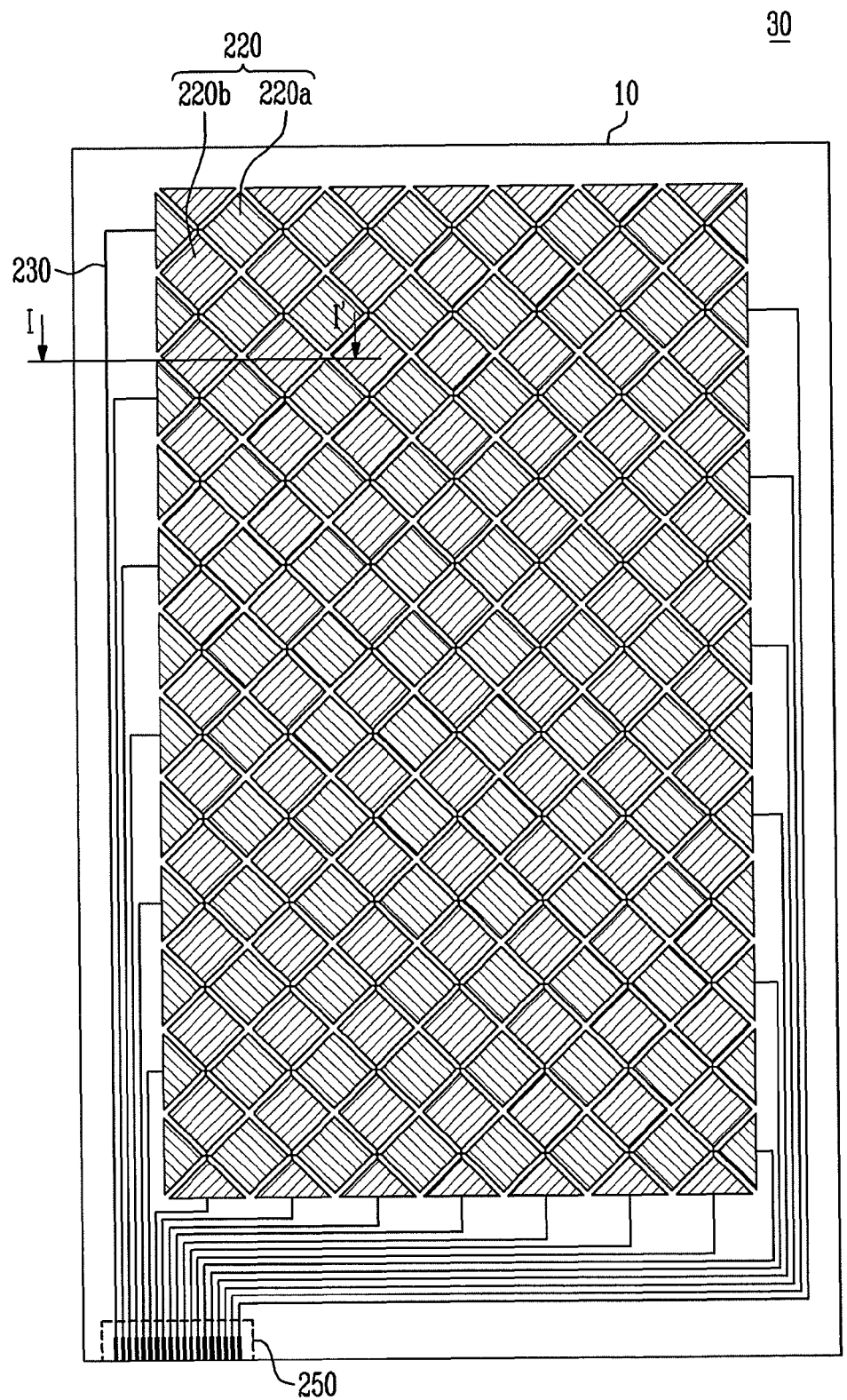
FIG. 1 illustrates a schematic plan view of a touch screen panel according to an embodiment.

Korean Patent Application No. 10-2012-0043833, filed on Apr. 26, 2012, in the Korean Intellectual Property Office, and entitled: "Flexible Touch Screen Panel And Flexible Display Device With The Same" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

Hereinafter, example embodiments will be described in detail with reference to the accompanying drawings.

Figure 2:
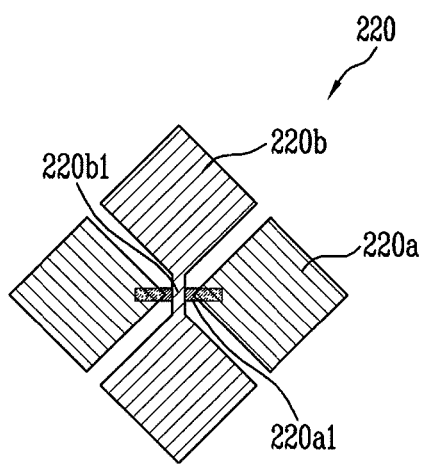
FIG. 2 illustrates an enlarged view of a sensing pattern in FIG. 1.
Figure 3:
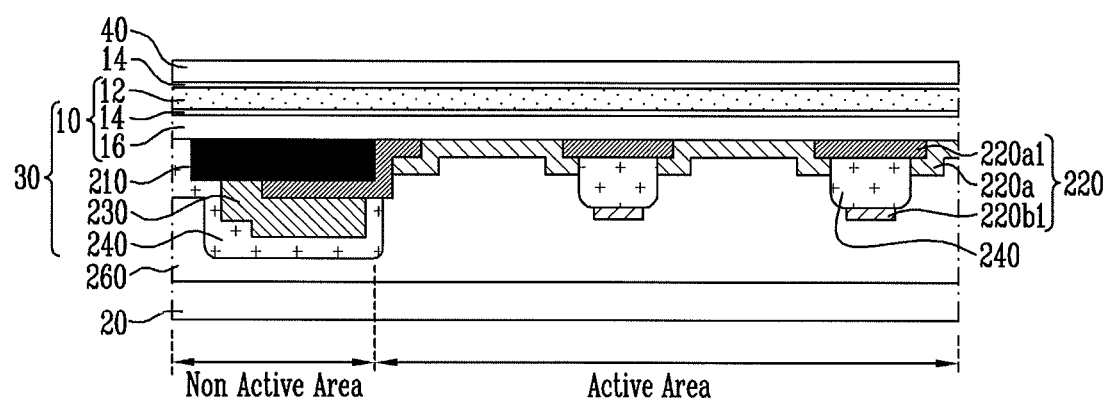
FIG. 3 illustrates a cross-sectional view along line I-I' of FIG. 1.

FIG. 1 is a schematic plan view of a touch screen panel according to an embodiment. FIG. 2 is an enlarged view of a sensing pattern illustrated in FIG. 1. FIG. 3 is a cross-sectional view along line I-I' of FIG. 1.

Referring to FIGS. 1 to 3, a touch screen panel 30 according to example embodiments may include a flexible polarizing film 10, sensing patterns 220 formed on a first surface of the polarizing film 10, and sensing lines 230 connecting the sensing patterns 220 to an external driving circuit (not shown) through a pad unit 250.

The polarizing film 10 according to example embodiments may include a polarizer 12 attached to a phase difference compensating layer 16 by a transparent adhesive 14, as illustrated in FIG. 3. For example, the polarizer 12 may be attached directly to the phase difference compensating layer 16 by the transparent adhesive 14, so the polarizer 12, transparent adhesive 14, and phase difference compensating layer 16 may be formed sequentially and directly on top of each other.

The polarizing film 10 may exhibit flexible characteristics, e.g., a high flexion characteristic. For example, the polarizing film 10 may be realized by removing supporting layers formed of triacetyl cellulose (TAC) from a conventional polarizing plate.

In detail, a conventional polarizing plate may include a conventional polarizer interposed between top and bottom supporting layers. The conventional polarizer may control an amount of transmitted light in accordance with a degree of polarization of incident light, and may be formed of a polymer film, e.g., polyvinyl alcohol (PVA) film. For example, the conventional polarizer may be formed by drawing the PVA film that absorbs iodine with strong tension to realize polarization. In addition, the PVA film may be provided between TAC supporting layers for increased protection and support. However, as TAC exhibits high elastic modulus, i.e., high degree of stiffness, attaching the conventional polarizing plate with the stiff TAC supporting layers to a flexible touch screen panel may reduce the flexibility of the flexible touch screen panel.

In addition, the conventional polarizing plate may be attached to an external surface of the image display panel in order to improve display characteristics, e.g., by blocking reflection of external light. When the touch screen panel is attached to the image display panel, the conventional polarizing plate may be attached to an external surface of the touch screen panel. However, as the polarizing plate and touch screen panel are manufactured separately and attached to each at a later stage, an overall thickness of the touch screen panel may increase and process efficiency, as well as yield of the touch screen panel, may decrease.

For example, when the conventional polarizing plate includes the conventional polarizer with a thickness of about 20 μm between top and bottom supporting layers, each of which has a thickness of about 80 μm, the conventional polarizing plate may have an overall thickness of about 180 μm. When the conventional polarizing plate is directly attached to the touch screen panel, the overall thickness of the touch screen panel increases, thereby providing an image display panel with increased size and weight.

Therefore, according to example embodiments, the polarizing film 10 may include the polarizer 12 without supporting layers. For example, the polarizer 12 may consist essentially of a single layer, e.g., a drawn polymer film, and the polarizing film 10 may consist essentially of the polarizer 12 attached to the phase difference compensating layer 16 via the transparent adhesive 14. As such, the polarizer 12 may exhibit flexibility, while being supported and protected by the transparent adhesive 14.

The polarizing film 10 may include the polarizer 12, e.g., with a thickness of about 20 μm, the transparent adhesive 14, e.g., with a thickness of about 1 μm to about 20 μm, and the phase difference compensating layer 16, e.g., with a thickness of about 50 μm. Therefore, an overall thickness of the polarizing film 10 may be about 71 μm to about 90 μm, which is substantially smaller than an overall thickness of the conventional polarizing plate with the TAC supporting layers, i.e., substantially smaller than about 180 μm.

That is, in the polarizing film 10, according to example embodiments, the transparent adhesive 14 may be a pressure sensitive adhesive (PSA) exhibiting low elastic modulus and high flexion characteristic. In other words, the transparent adhesive 14 may be flexible, and may be applied to the polarizer 12, instead of the conventional TAC supporting layers, thereby minimizing an overall thickness of the polarizing film 10 and maximizing flexibility thereof.

In the touch screen panel 30 according to example embodiments, the sensing patterns 220 and the sensing lines 230 may be formed on, e.g., directly on, a surface of the polarizing film 10. For example, as illustrated in FIG. 3, the sensing patterns 220 may contact directly a surface of the phase difference compensating layer 16, so the phase difference compensating layer 16 may be between the transparent adhesive 14 and the sensing patterns 220. That is, a first surface of the phase difference compensating layer 16 may define a surface of the polarizing film 10 and may contact directly the sensing patterns 220, and a second surface of the phase difference compensating layer 16 opposite the first surface may directly contact the transparent adhesive 14. Therefore, the flexible touch screen panel 30 may be integrated with the polarizing film 10.

As illustrated in FIG. 3, a window substrate 40 may be attached to a second surface, i.e., a surface opposite the first surface, of the polarizing film 10. That is, the window substrate 40 and the sensing patterns 220 may be attached to opposite surfaces of the polarizing film 10. In other words, the window substrate 40 may be attached to the polarizer 12, so the polarizer 12 may be between the window substrate 40 and the transparent adhesive 14. For example, the window substrate 40 may be formed of a flexible material.

The structure of the touch screen panel 30 according to example embodiments will be described as follows.

As illustrated in FIG. 2, the sensing pattern 220 may include a plurality of first sensing cells 220a formed to be coupled to each other in each row line in a row direction, first coupling lines 220a1 for coupling the first sensing cells 220a in the row direction, second sensing cells 220b formed to be coupled to each other in each column line in a column direction, and second coupling lines 220b1 for coupling the second sensing cells 220b in the column direction.

For convenience, only a part of the sensing pattern is illustrated in FIG. 2. However, the touch screen panel has a structure in which the sensing patterns illustrated in FIG. 2 may be repetitively arranged.

For example, as illustrated in FIG. 1, the first sensing cells 220a and the second sensing cells 220b may be alternately arranged not to overlap each other. The first coupling lines 220a1 and the second coupling lines 220b1 may intersect each other. An insulating layer (not shown) for securing stability may be interposed between the first coupling lines 220a1 and the second coupling lines 220b1.

In another example, the first sensing cells 220a and the second sensing cells 220b may be formed to be integrated with or separated from respective first coupling lines 220a1 and second coupling lines 220b1. The first sensing cells 220a and the second sensing cells 220b may include transparent electrode material, e.g., indium tin oxide (ITO), to be electrically coupled to the first coupling lines 220a1 and the second coupling lines 220b1.

For example, the second sensing cells 220b may be patterned to be integrated with the second coupling lines 220b1 in the column direction. In this case, the first sensing cells 220a may be patterned between the second sensing cells 220b to have independent patterns and may be coupled to each other by the first coupling lines 220a1 positioned on or under the first sensing cells 220a in the row direction.

The first coupling lines 220a1 may directly contact the first sensing cells 220a on or under the first sensing cells 220a, e.g., to contact an upper or lower surface of the first sensing cells 220a, to be electrically coupled to the first sensing cells 220a. Alternatively, the first coupling lines 220a1 may be electrically coupled to the first sensing cells 220a through contact holes. The first coupling lines 220a1 may be formed of a transparent electrode material, e.g., ITO, or may be formed of an opaque low resistance metal material, so that the width thereof is controlled to prevent the patterns from being visible.

Referring to FIG. 1, the sensing lines 230 may be electrically coupled to the first and second sensing cells 220a and 220b in units of row and column lines to couple the first and second sensing cells 220a and 220b to an external driving circuit (not shown), e.g., a position detecting circuit, through the pad unit 250. As illustrated in FIG. 3, the sensing lines 230 may be arranged in a non active region positioned on the outline of an active region in which an image is displayed. For example, the sensing lines 230 may be formed of a low resistance metal material, e.g., Mo, Ag, Ti, Cu, Al, and Mo/Al/Mo, a transparent conductive material used for forming the sensing patterns 220, etc.

When a contact object, e.g., a human hand or a stylus pen, contacts the above-described electrostatic capacitive touch screen panel according to example embodiments, a change in electrostatic capacity in accordance with a contact position is transmitted from the sensing patterns 220 to a driving circuit (not shown) via the sensing lines 230 and the pad unit 250. Then, the change in the electrostatic capacity is converted into an electrical signal by an X and Y input processing circuit (not shown) to input the contact position.

Referring to FIG. 3, which illustrates parts of the non active region and the active region of the touch screen panel formed on the first surface of the flexible polarizing film 10, the polarizing film 10 may include the polarizer 12, the transparent adhesive 14, and the phase difference compensating layer 16. The first surface of the polarizing film 10 corresponds to a surface of the phase difference compensating layer 16 facing the sensing patterns 220, as illustrated in FIG. 3.

As further illustrated in FIG. 3, a display device 20 may be attached by a transparent adhesive layer 260 to the touch screen panel 30. That is, the transparent adhesive layer 260 may attach the display device 20 to a bottom surface of the touch screen panel 30, i.e., to the sensing pattern 220 on the first surface of the polarizing film 10. For example, the display device 20 may be a flexible display device, e.g., a flexible organic light emitting diode display.

For example, since the organic light emitting diode display is a self-emissive display, i.e., a display device that generates light and does not need a backlight unit, the display device 20 may include a flexible substrate. For example, the substrate of the display device 20 may be formed of at least one of polymethyl methacrylate (PMMA), acryl, polyester, e.g., polyethylene terephthalate (PET), etc. Therefore, the organic light emitting display may exhibit flexibility characteristics. In contrast, a conventional LCD requires a backlight unit, thereby exhibiting reduced flexibility.

The transparent adhesive layer 260 may be formed of a transparent adhesive material having high light transmittance, e.g., super-view resin (SVR) or optical cleared adhesive (OCA). That is, the transparent adhesive layer 260 may be formed of a different material than the transparent adhesive 14 in the polarizing film 10.

As further illustrated in FIG. 3, the sensing patterns 220 formed on the active region of the polarizing film 10 may include the first sensing cells 220a formed to be coupled to each other in each row line in the row direction, the first coupling lines 220a1 for coupling the first sensing cells 220a in the row direction, the second sensing cells 220b formed to be coupled to each other in each column line in the column direction, and the second coupling lines 220b 1 for coupling the second sensing cells 220b in the column direction. An insulating layer 240 may be interposed at the intersections of the first coupling lines 220a1 and the second coupling lines 220b1. It is noted that the thickness in FIG. 3 of the elements, e.g., the sensing patterns 220, that form the touch screen panel may be exaggerated for convenience of explanation. An actual thickness of the elements may be much smaller.

As further illustrated in FIG. 3, a black matrix 210 and the sensing lines 230 formed to overlap the black matrix 210 and to be electrically coupled to the sensing patterns 220 may be formed in the non active region positioned on the outline of the active region. The black matrix 210 prevents the patterns, e.g., the sensing lines 230 formed in the non active region, from being visible and forms the frame of the display region.

In the above-described structure, according to example embodiments, the touch screen panel 30 may be positioned between the display device 20 and the window substrate 40, while the polarizing film 10 is on the window substrate 40. Therefore, the touch screen panel 30 may maintain flexibility, prevent visibility of the sensing patterns therethrough, and minimize reflectance. The window substrate 40 attached to the top surface of the polarizing film 10, i.e., a surface of the polarizer 12 not attached to the phase difference compensating layer 16, may improve the strength of the apparatus.

As described above, since the display device 20 and the touch screen panel 30 exhibit flexible characteristics, the window substrate 40 may also be flexible. For example, according to example embodiments, the window substrate 40 may be formed of at least one of PMMA, acryl, polyester, and may be formed to have a thickness of about 0.7 mm.

The touch screen panel according example embodiments may exhibit flexible characteristics as described above. Therefore, a user may bend the display device 20 with the touch screen panel 30 at a predetermined angle, e.g., the predetermined angle may be determined relative to a substantially flat position of the display device 20. An optimal predetermined angle, i.e., an optimal angle between an axis around which the touch screen panel 20 is bent and an absorption axis of the polarizer 12, may be determined to optimize picture quality characteristic of the display device 20.

In detail, as the conventional polarizer is formed by drawing, e.g., pulling, a polymer film, e.g., a PVA based resin, the conventional polarizer is more sensitive to light from a particular direction because the molecular arrangement in the polymer film has large directivity in the drawing direction of the film, i.e., the absorption axis of the polarizer. That is, the conventional polarizer absorbs light by iodine or dichroic dye aligned in the drawing direction to perform a polarizing function. Since the polymer is aligned in the drawing direction, the polymer coupling force deteriorates in the direction vertical to the drawing direction, and the conventional polarizer may easily crack when bent in the vertical direction.

Therefore, the flexible display device 20 with the flexible touch screen panel 30 according to the example embodiments are arranged as to withstand fatigue load, e.g., when the flexible touch screen panel 30 is bent and continuous stress due to the bending is generated in a specific direction. As described above, in the case of the polarizer 12 formed by one axis drawing, since molecular bond in the direction vertical to the drawing direction, i.e., in a direction perpendicular to the absorption axis of the polarizer, is vulnerable, the polarizer 12 may be designed so that the angle between the absorption axis of the polarizer 12 and a bending axis of the touch screen panel 30 may be about 45 degrees to about 90 degrees. Accordingly, material fatigue and/or cracking of the polarizer 12 may be prevented or substantially minimized.

Figure 4:
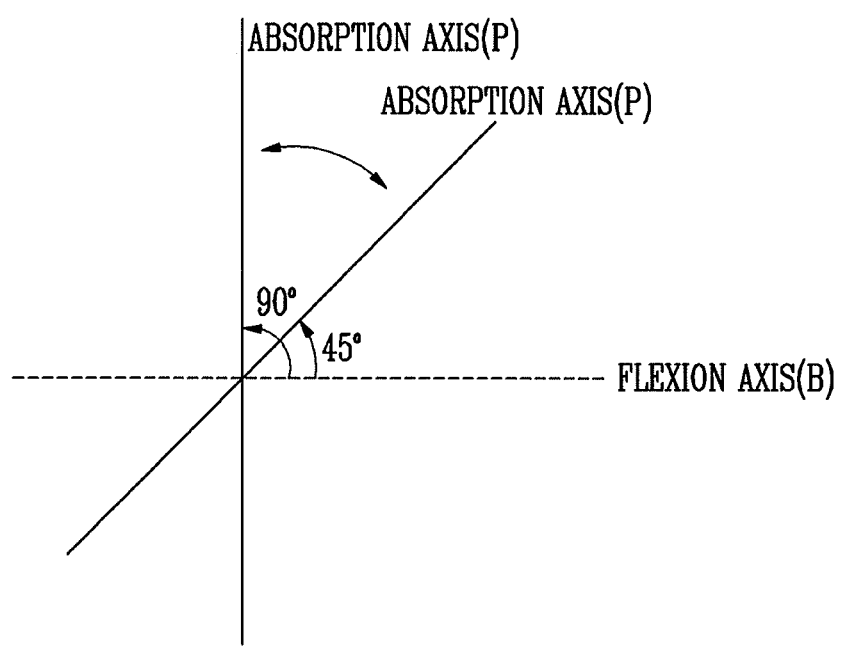
FIG. 4 illustrates a graph of an optimal angle between an absorption axis of a polarizer and a bending axis of a touch screen panel according to an embodiment.

FIG. 4 is a graph illustrating the optimal angle between the absorption axis of the polarizer 12 and a bending axis, i.e., flexion axis, of the touch screen panel according to example embodiments. It is noted that the bending axis, e.g., a flexion axis, of the touch screen panel refers to an axis along which the touch screen panel is bent from a flat position to bring two edges thereof closer to each other, i.e., to decrease an angle between the two edges.

As illustrated in FIG. 4, when it is assumed that the bending axis B, i.e., an axis around which the touch screen panel bends, is 0 degrees, the polarizer 12 may be designed to have the absorption axis P thereof at an angle of about 45 degrees to about 90 degrees with respect to the bending axis B. For example, when it is assumed that the absorption axis P of the polarizer 12 is about 90 degrees, the molecular alignment in the polarizer 12 has large directivity in the direction of about 90 degrees, i.e., a same direction as a flat touch screen panel, and the bending axis B of the touch screen panel is at about 0 degrees to about 45 degrees.

In other words, when the touch screen panel is substantially flat and is parallel to the absorption axis P of the polarizer 12, the bending axis B of the touch screen panel may be adjusted to be at about 90 degrees with respect to the absorption axis P of the polarizer 12. Therefore, when the angle between the absorption axis P of the polarizer 12 and the bending axis B of the touch screen panel is 90 degrees, cracking of the polarizing plate 10 may be minimized.

On the other hand, when the angle of an absorption axis of the conventional polarizer and the bending axis of the touch screen panel are parallel, the absorption axis of the polarizer is vertical, i.e., perpendicular, with respect to the direction of the flat touch screen panel. In this case, since the molecular bond of the absorption axis in the vertical direction is vulnerable, cracking in the polarizer may be generated. In addition, when the angle of the absorption axis of the polarizer is less than 45 degrees with respect to the bending axis, mechanical bending characteristic of the polarizer may be insecure.

According to example embodiments, the polarizer may be directly attached to the phase difference compensating layer via a transparent adhesive, i.e., without additional supporting layers, thereby increasing flexibility and reducing thickness of the polarizing film. Further, as the sensing patterns may be formed on the resultant polarizing film, flexibility may be secured, thickness of the flexible touch screen panel may be reduced, and image display characteristics may be improved. In addition, since mechanical bending has directivity due to the polarizer, the optimal angle between the bending axis of the touch screen panel and the absorption axis of the polarizer may be adjusted to improve picture quality of the flexible display device.

In contrast, the conventional touch screen panel may include sensing patterns formed on a glass substrate, i.e., rather than on a polarizing film. However, as glass substrates having a uniform thickness can only be realized for a certain limit, smaller thicknesses may not be achieved and a flexible characteristic may not be realized in the conventional touch screen panel.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the example embodiments as set forth in the following claims.

What is claimed is:

1. A flexible touch screen panel, comprising:
    a flexible polarizing film having an active region and a non-active region, the non-active region being along an outline of the active region, and the flexible polarizing film including:
        a flexible polarizer,
        a phase difference compensating layer defining a first surface of the flexible polarizing film, and
        a flexible transparent adhesive between the phase difference compensating layer and the flexible polarizer, the flexible transparent adhesive being configured to support the flexible polarizer, the flexible polarizer being directly attached to the phase difference compensating layer via the transparent adhesive without additional supporting layers;

sensing patterns directly on the first surface of the flexible polarizing film, the sensing patterns being in the active region; and sensing lines directly on the first surface of the flexible polarizing film, the sensing lines being in the non active region and being coupled to the sensing patterns, wherein an angle between an absorption axis of the flexible polarizer and a bending axis of the flexible touch screen panel is from about 45 degrees to less than 90 degrees.

2. The flexible touch screen panel as claimed in claim 1, wherein the flexible transparent adhesive is a pressure sensitive adhesive (PSA).

3. The flexible touch screen panel as claimed in claim 1, further comprising a flexible window substrate on a second surface of the flexible polarizing film, the flexible polarizer being between the flexible window substrate and the flexible transparent adhesive.

4. The flexible touch screen panel as claimed in claim 3, wherein the flexible window substrate includes at least one of polymethyl methacrylate (PMMA), acryl, and polyester.

5. The flexible touch screen panel as claimed in claim 1, wherein the flexible polarizer includes a drawn polymer film and the absorption axis is in the drawing direction.

6. The flexible touch screen panel as claimed in claim 5, wherein the drawn polymer film includes polyvinyl alcohol based resin.

7. The flexible touch screen panel as claimed in claim 1, wherein the sensing patterns include:
  first sensing cells coupled to each other in a first direction;
  first coupling lines coupling adjacent first sensing cells;
  second sensing cells coupled to each other in a second direction; and
  second coupling lines coupling adjacent second sensing cells.

8. The flexible touch screen panel as claimed in claim 7, further comprising an insulating layer at intersections of the first coupling lines and the second coupling lines.

9. The flexible touch screen panel as claimed in claim 1, further comprising a black matrix in the non active region of the first surface of the flexible polarizing film.

10. The flexible touch screen panel as claimed in claim 1, wherein the flexible polarizing film has a thickness of from about 71 μm to about 90 μm.

11. A flexible touch screen panel, comprising:
  a polarizing film having an active region and a non-active region, the non-active region being along an outline of the active region, and the polarizing film including:
    a flexible polarizer,
    a phase difference compensating layer defining a first surface of the polarizing film, and
    a flexible transparent adhesive between the phase difference compensating layer and the flexible polarizer, the flexible transparent adhesive being configured to support the flexible polarizer, the flexible polarizer being directly attached to the phase difference compensating layer via the flexible transparent adhesive without additional supporting layers;

sensing patterns directly on the first surface of the polarizing film, the sensing patterns being in the active region; and sensing lines directly on the first surface of the polarizing film, the sensing lines being in the non active region and being coupled to the sensing patterns, wherein the phase difference compensating layer, the flexible transparent adhesive, and the flexible polarizer are directly stacked on the sensing patterns, wherein an angle between an absorption axis of the flexible polarizer and a bending axis of the flexible touch screen panel is from about 45 degrees to less than 90 degrees.

12. The flexible touch screen panel as claimed in claim 11, wherein the flexible transparent adhesive is directly between the phase difference compensating layer and the flexible polarizer.

13. The flexible touch screen panel as claimed in claim 11, wherein the polarizing film consists essentially of the phase difference compensating layer, the flexible transparent adhesive, and the flexible polarizer.

14. A flexible display device with a flexible touch screen panel, the flexible display device comprising:
  a flexible polarizing film having an active region and a non-active region, the non-active region being along an outline of the active region, and the flexible polarizing film including:
    a flexible polarizer,
    a phase difference compensating layer defining a first surface of the flexible polarizing film, and
    a flexible transparent adhesive between the phase difference compensating layer and the flexible polarizer, the flexible transparent adhesive being configured to support the flexible polarizer, the flexible polarizer being directly attached to the phase difference compensating layer via the flexible transparent adhesive without additional supporting layers;

sensing patterns directly on the first surface of the flexible polarizing film, the sensing patterns being in the active region;

sensing lines directly on the first surface of the flexible polarizing film, the sensing lines being in the non active region and being coupled to the sensing patterns; and a flexible display device attached facing the first surface of the flexible polarizing film to face the sensing patterns and the sensing lines, wherein an angle between an absorption axis of the flexible polarizer and a bending axis of the flexible touch screen panel is from about 45 degrees to less than 90 degrees.

15. The flexible display device as claimed in claim 14, wherein the flexible display device is an organic light emitting display.

16. The flexible display device as claimed in claim 14, further comprising a flexible window substrate on a second surface of the flexible polarizing film.

17. The flexible display device as claimed in claim 16, wherein the flexible window substrate includes at least one of polymethyl methacrylate (PMMA), acryl, and polyester.

* * * * *